United States Patent
Benedict et al.

(10) Patent No.: US 9,870,221 B2
(45) Date of Patent: Jan. 16, 2018

(54) PROVIDING CODE CHANGE JOB SETS OF DIFFERENT SIZES TO VALIDATORS

(71) Applicant: Hewlett-Packard Development Company, L.P., Houston, TX (US)

(72) Inventors: Elad Benedict, Yehud (IL); Liron Tzabari, Yehud (IL); Amir Wigelman, Yehud (IL)

(73) Assignee: EntIT Software LLC, Sunnyvale, CA (US)

(*) Notice: Subject to any disclaimer, the term of this patent is extended or adjusted under 35 U.S.C. 154(b) by 53 days.

(21) Appl. No.: 14/765,099

(22) PCT Filed: Feb. 28, 2013

(86) PCT No.: PCT/US2013/028156
§ 371 (c)(1),
(2) Date: Jul. 31, 2015

(87) PCT Pub. No.: WO2014/133512
PCT Pub. Date: Sep. 4, 2014

(65) Prior Publication Data
US 2015/0370554 A1    Dec. 24, 2015

(51) Int. Cl.
*G06F 9/44* (2006.01)
*G06F 9/45* (2006.01)
*G06F 11/36* (2006.01)

(52) U.S. Cl.
CPC .............. *G06F 8/70* (2013.01); *G06F 8/30* (2013.01); *G06F 11/3688* (2013.01); *G06F 11/3692* (2013.01)

(58) Field of Classification Search
CPC .......... G06F 8/70; G06F 8/30; G06F 11/3688; G06F 11/3692
See application file for complete search history.

(56) References Cited

U.S. PATENT DOCUMENTS 6,385,741 B1    5/2002  Nakamura
7,454,659 B1 *  11/2008 Gaudette ............. G06F 11/3664
                                                            714/33
(Continued)

FOREIGN PATENT DOCUMENTS

JP    04-036831 A    2/1992
JP    08-006777 A    1/1996
(Continued)

OTHER PUBLICATIONS

Ajay Sood, IBM InfoSphere DataStage job validation steps using IBM Optim Test Data Management Solution, 2013, pp. 1-27. https://www.ibm.com/developerworks/data/library/techarticle/dm-1303datastagejobvalidation/index.html.*
(Continued)

*Primary Examiner* — Thuy Dao
*Assistant Examiner* — Mongbao Nguyen

(57) ABSTRACT

Examples disclosed herein relate to providing code change job sets of different sizes to validators. Examples include placing a plurality of jobs in a queue, each job including at least one code change requested to be committed to shared code. Examples further include providing job sets of different sizes to a plurality of validators, each of the job sets comprising a consecutive group of one or more of the jobs in the queue at a given time and beginning with the job at the front of the queue at the given time.

17 Claims, 3 Drawing Sheets

(56) References Cited

U.S. PATENT DOCUMENTS

| | | | |
|---|---|---|---|
| 7,568,183 B1 | 6/2009 | Hardy et al. | |
| 7,590,973 B1* | 9/2009 | Barry | G06F 11/3688 714/38.14 |
| 7,596,778 B2 | 9/2009 | Kolawa et al. | |
| 8,037,452 B2 | 10/2011 | Minium et al. | |
| 8,418,147 B1* | 4/2013 | Odenwelder | G06F 11/3684 717/128 |
| 8,627,322 B2* | 1/2014 | Chaudhry | G06F 9/5027 718/102 |
| 8,782,606 B1* | 7/2014 | Cohen | G06F 11/3672 717/124 |
| 8,826,286 B2* | 9/2014 | Boris | G06F 9/5083 712/201 |
| 8,893,086 B2* | 11/2014 | Bassin | G06Q 10/06 717/124 |
| 9,535,765 B1* | 1/2017 | Konerding | G06F 9/5072 |
| 2004/0128652 A1* | 7/2004 | Mandava | G06F 11/3688 717/124 |
| 2004/0154001 A1 | 8/2004 | Haghighat et al. | |
| 2005/0204340 A1* | 9/2005 | Ruminer | G06F 8/70 717/123 |
| 2008/0127094 A1* | 5/2008 | Squires | G06F 11/3688 717/124 |
| 2008/0189712 A1* | 8/2008 | Boris | G06F 9/5083 718/103 |
| 2009/0265693 A1 | 10/2009 | Bakowski | |
| 2011/0145788 A1 | 6/2011 | Xu et al. | |
| 2011/0276939 A1 | 11/2011 | Frankin et al. | |
| 2011/0276977 A1* | 11/2011 | van Velzen | G06F 9/5038 718/104 |
| 2011/0296386 A1* | 12/2011 | Woollen | G06F 8/70 717/124 |
| 2012/0017195 A1* | 1/2012 | Kaulgud | G06F 11/3692 717/101 |
| 2012/0089964 A1* | 4/2012 | Sawano | G06F 11/3684 717/124 |
| 2012/0159420 A1* | 6/2012 | Yassin | G06F 11/3672 717/101 |
| 2012/0204180 A1* | 8/2012 | Santoli | G06Q 10/00 718/101 |
| 2012/0246620 A1 | 9/2012 | Bellucci et al. | |
| 2013/0024842 A1 | 1/2013 | Browne et al. | |
| 2013/0111267 A1* | 5/2013 | Beryoza | G06F 11/3688 714/32 |
| 2013/0159964 A1* | 6/2013 | Szpak | G06F 11/3684 717/105 |
| 2013/0212562 A1* | 8/2013 | Fox | G06F 8/65 717/120 |
| 2014/0068570 A1* | 3/2014 | Cox | G06F 8/44 717/137 |
| 2014/0157238 A1* | 6/2014 | Popov | G06F 11/3672 717/126 |
| 2014/0282421 A1* | 9/2014 | Jubran | G06F 11/3664 717/126 |

FOREIGN PATENT DOCUMENTS

| | | |
|---|---|---|
| KR | 10-2006-0069576 A | 6/2006 |
| KR | 10-2013-0008951 A | 1/2013 |

OTHER PUBLICATIONS

Gary McGraw, Software Security Testing, 2004, pp. 1-5. https://www.cs.purdue.edu/homes/xyzhang/fall07/Papers/sw-test.pdf.*

Matei Zaharia, Job Scheduling for Multi-User MapReduce Clusters, 2009, pp. 1-16. https://pdfs.semanticscholar.org/304b/112d89079962e4f38033aa82dba5bfbdb707.pdf.*

Anonymous, "Gerrit Code Review—A Quick Introduction," Feb. 12, 2013, <http://gerrit-documentation.googlecode.com/svn/Documentation/2.5.2/intro-quick.html>.

Ben McGraw, "You're Doing it Wrong: Commit Hooks!," Mar. 14, 2011, retrieved from: <http://www.slideshare.net/mcgrue/commit-hooks-the-subtle-hammer>.

Brian Harry, "Pre-checkin validation for TFS," Oct. 14, 2008, <http://blogs.msdn.com/b/bharry/archive/2008/10/14/pre-checkin-validation-for-tfs.aspx>.

CA, "CA Product Vision," 2012, <http://web.arhive.org/web/20130319073707/http://www.ca.com/~/media/Files/ProductBr.

Electric Cloud, "ElectricCommander," retrieved Feb. 25, 2013, retrieved from: <http://www.electric-cloud.com/products/electric-commander.php>.

Guillaume Rouchon, "TeamBuild 2010 : Gated Check-in and Private Build," Nov. 30, 2009, Guillaume Rouchon's Blog, <http://blog.qetza.net/en/2009/11/30/teambuild-2010-gated-check-in-et-private-build/>.

IBM, "Collaborative Lifecycle Management," Oct. 18, 2012, (web page), <http://web.archive.org/web/20121018012024/http://www-01.ibm.com/software/rational/alr.

IBM, "IBM Rational Team Concert," Jan. 6, 2011, (web page), <http://web.archive.org/web/20110106155823/http://www-01.ibm.com/software/rational/prc.

IBM, "Rational Quality Manager," Sep. 14, 2012, (web page), <http://web.archive.org/web/20120914001806/http://www-01.ibm.com/software/rational/prc.

IBM, "Rational Requirements Composer," Sep. 14, 2012, (web page), <http://web.archive.org/web/20120914001734/http://www-01.ibm.com/software/awdtools/r.

International Searching Authority, International Search Report & Written Opinion, issued in PCT/US2013/028156, dated Sep. 6, 2013, 9 pages.

Jetbrains, "Pre-Tested Commit: No broken code in your version control. Ever.," TeamCity, retrieved Feb. 25, 2013, retrieved from: <http://www.jetbrains.com/teamcity/features/delayed_commit.html>.

LDRA Ltd., "TBrun(R)," (web page), Feb. 19, 2013, <http://www.ldra.com/index.php/products-a-services/ldra-tool-suite/tbrun>.

Leon Mayne, "Open Gauntlet Project," Oct. 2, 2012, (web page), <http://www.opengauntlet.org/>.

Markus Sprunck, "How to Run Findbugs, Pmd, Checkstyle, JUnit and Cobertrua with an Ant Build-Script?," Sep. 18, 2012, <http://www.sw-engineering-candies.com/blog-1/howtorunfindbugs-pmdcheckstylejunitcobertruawithasimpleantbuildscript>.

Microsoft Corporation, "TFS Check-in Validation Tool," Mar. 22, 2009, Installation Guide Version 1.0.0.75, <http://buddybuildtool.com/buddybuild/guide/index.htm>.

Microsoft, "Team Foundation Server," Feb. 19, 2013, <http://web.archive.org/web/20130219031407/http://msdn.microsoft.com/en-us/vstudio/ff6:.

Microsoft, "Branch Strategically," retrieved Feb. 25, 2013, retrieved from: <http://msdn.microsoft.com/en-us/library/ee782536.aspx>.

Microsoft, "Check in to a Folder that is Controlled by a Gated Check-in Build Process," retrieved Dec. 10, 2012, retrieved from < http://msdn.microsoft.com/en-us/library/dd794776.aspx>.

Microsoft, "Define a Gated Check-In Build Process to Validate Changes," retrieved Dec. 10, 2012, retrieved from <http://msdn.microsoft.com/en-us/library/dd787631.aspx>.

PTC Inc., "Automated Verification," retrieved Dec. 12, 2012, retrieved from: <http://www.mks.com/solutions/discipline/dm/verification>.

Schneider et al., "eclipse-cs: The Checkstyle plug-in for Eclipse," Jan. 14, 2013, <http://web.archive.org/web/20130114230103/http://eclipse-cs.sourceforge.net/>.

SmartBear Software, "Advanced Test Case Management," (web page), 3 pages, Feb. 13, 2013, <http://smartbear.com/products/qa-tools/test-management/test-case-management>.

Tarun Arora, "VS 2012 Code Review—Before Check in or After Check in?," Dec. 10, 2012, <http://geekswithblogs.net/TarunArora/archive/2012/09/18/vs-2012-code-review-ndash-before-check-in-or-after.aspx>.

UTest Inc., "Bug Fix verification," retrieved Dec. 12, 2012, retrieved from: <http://c954852.r52.cf0.rackcdn.com/uTest-v4-Bug-Fix-Verification.pdf>.

(56) References Cited

OTHER PUBLICATIONS

Viewtier Systems, Inc., "Automerge: Automated Inter-branch Merging for Software Configuration Management," Feb. 13, 2013, (web page), 3 pages, <http://www.viewtier.com/products/parabuild/automated_merges_for_scm.htm>.

Wikipedia, "Continuous Integration," Nov. 26, 2012, <http://en.wikipedia.org/wiki/Continuous_integration>.

Wikipedia, "Git (software)," Feb. 17, 2013<http://en.wikipedia.org/wiki/Git_(software)>.

Extended European Search Report received in EP Application No. 13876148.1, Sep. 9, 2016, 7 pages.

* cited by examiner

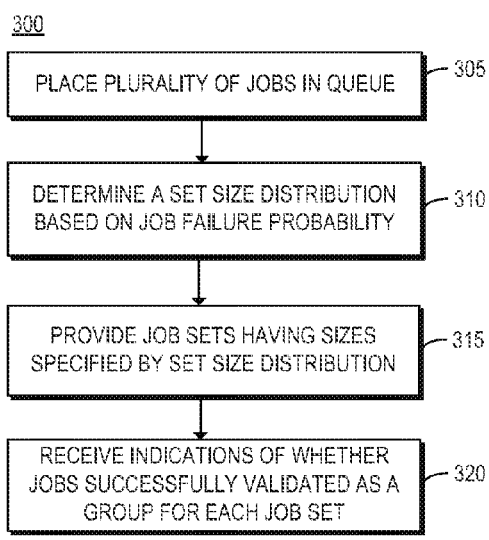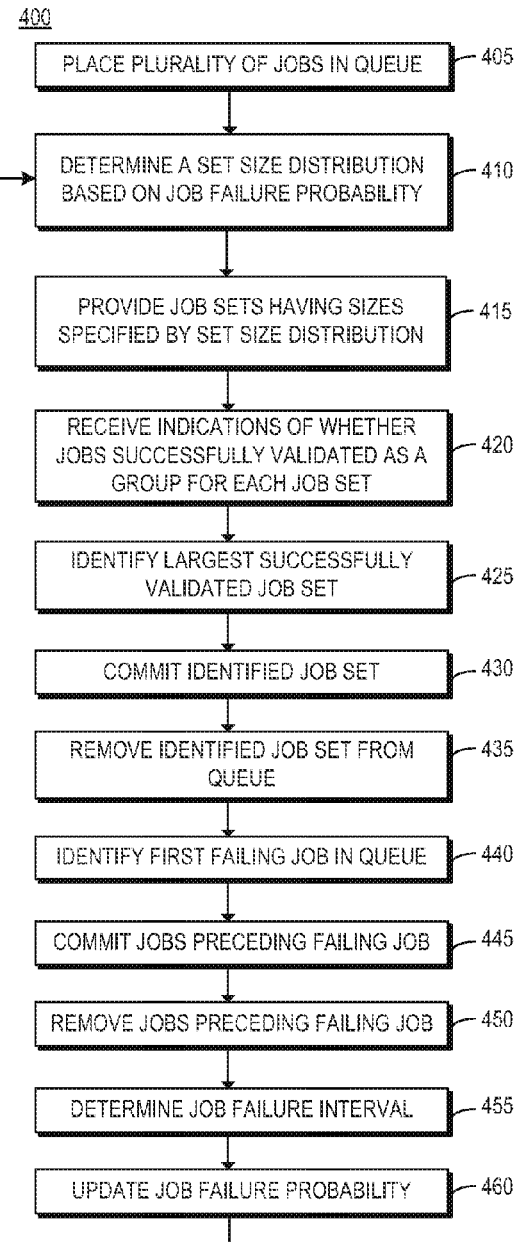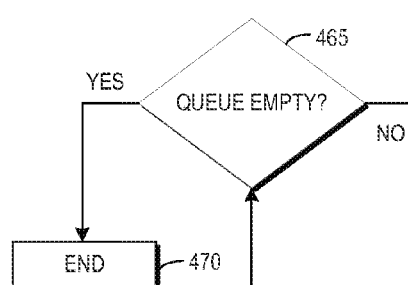
FIG. 3
FIG. 4

PROVIDING CODE CHANGE JOB SETS OF DIFFERENT SIZES TO VALIDATORS

BACKGROUND

In some situations, many source code developers may work on shared code for a software project under development (e.g., a computer application, etc.). In some examples, a source code management (SCM) system may be utilized as a central repository for maintaining a current version of the shared code. In such examples, each developer may retrieve the current version of the shared code from the SCM system and may commit their code changes to the shared code maintained in the SCM system.

BRIEF DESCRIPTION OF THE DRAWINGS

The following detailed description references the drawings, wherein:

FIG. 3 is a flowchart of an example method for determining a set size distribution based on a number of jobs probabilistically expected to be successfully validated as a group; and FIG. 4 is a flowchart of an example method for updating a job failure probability based on a job fail interval.

DETAILED DESCRIPTION

Figure 1A:
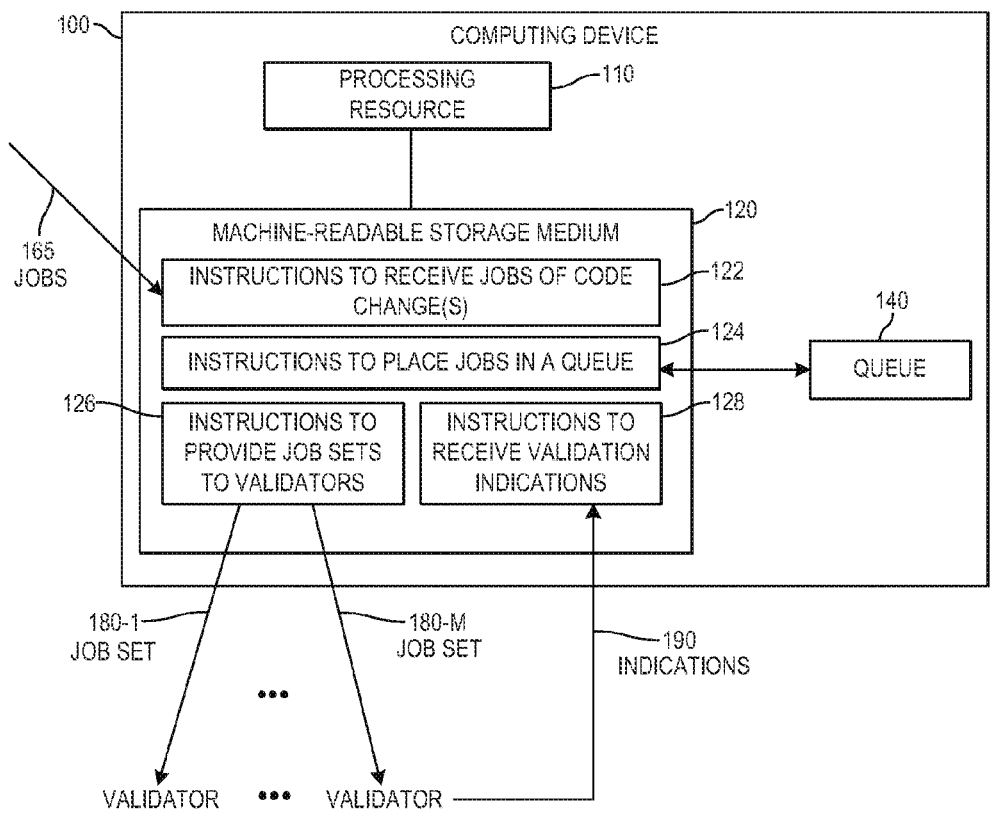
FIG. 1A is a block diagram of an example computing device to provide a different size job set to each of a plurality of validators.

As noted above, software developers working on shared code for a software project under development (e.g., a computer application, etc.) may utilize a source code management (SCM) system as a central repository for maintaining a current version of shared code. As used herein, "shared code" may include at least one file of machine-readable instructions (e.g., source code, etc.) associated with a software project under development and maintained in a repository for access by a plurality of different software developers or other users. As used herein, "software" may refer to a collection of machine-readable instructions (e.g., source code, etc.) executable by a processing resource of a computing device.

As noted above, each developer may retrieve the current version of the shared code from the SCM system and may update the shared code by committing their code changes to the shared code maintained SCM system. As used herein, to "commit" code changes to shared code may include merging, saving, or otherwise incorporating the code changes into the shared code. However, a developer may commit code changes that introduce an error into the shared code. The introduced error may prevent the shared code from compiling, running, etc., cause a functional regression (e.g., break previously working functionalities), or otherwise break the shared code. In such examples, the error may propagate to other developers when they sync their workspaces to with the latest version of the shared code, leaving these developers with non-working environments and waiting idly for the shared code to be corrected.

In some examples, changes to the shared code may be tested before being committed to the shared code. Code changes that pass the testing may be committed, while changes that fail the testing may be rejected (e.g., not committed to the shared code). However, compiling and testing the shared code independently for each set of code changes submitted may be a time-consuming process. Additionally, if multiple sets of code changes are tested together, and the testing fails, finding and rejecting the failing set of changes may involve re-testing each set of changes individually.

To address these issues, examples described herein may receive a plurality of jobs, each including at least one code change requested to be committed to shared code, place each of the jobs in a queue, and provide a different size job set to each of a plurality of validators, each of the job sets comprising a consecutive group of one or more of the jobs in the queue at a given time and beginning with the job at the front of the queue at the given time. Examples described herein may further receive, from each validator, an indication of whether all of the jobs of the provided job set were successfully validated as a group by the validator.

In some examples, each of the provided job sets may overlap, with the larger of each pair of the job sets including all of the jobs of the smaller job set, and each job set beginning with the job at the front of the queue. Additionally, each validator may apply and attempt to validate all of the code changes of its provided job set as a group (e.g., together as a single set of code changes), and all of the validators may perform this process in parallel. In this manner, examples described herein may validate as a group, and subsequently commit as a group, the code changes of each job of the largest entirely valid job set among the job sets provided to the validators. Examples described herein may thereby reduce the amount of time involved in testing all of the code changes in the queue. Also, by performing validation on different sized overlapping jobs sets in parallel, examples described herein may identify the first failing job in the queue as belonging to the relatively small sequence of jobs making up the difference between the largest valid job set and the next largest job set (i.e., the smallest failing job set). Examples described herein may thereby reduce the amount of time involved in validating code changes prior to commit, and reduce the amount of time for identifying a first invalid job in the queue when validating multiple jobs together.

Additionally, some examples described herein may determine the respective sizes of the job sets based on the number of jobs probabilistically expected to be successfully validated as a group. In this manner, examples described herein may prudently select the sizes of the job sets to validate as a group to increase the chances of successfully validating relatively large sets of jobs in the queue, which may thereby reduce the time consumed by the process of validating code changes before committing them to the shared code. Also, by controlling what code changes are committed and when, examples described herein may maintain the shared code in a continuously consistent and valid state, by preventing any code changes from being committed to the shared code while another set of code changes is in the process of being validated and committed.

Referring now to the drawings. FIG. 1A is a block diagram of an example computing device 100 to provide a different size job set to each of a plurality of validators. As used herein, a "computing device" may be a desktop computer, notebook computer, workstation, tablet computer, mobile phone, smart device, server, or any other processing device or equipment. In the example of FIG. 1A, computing device 100 includes a processing resource 110 and a machine-readable storage medium 120 encoded with instructions 122, 124, 126, and 128. In some examples, storage medium 120 may include additional instructions. In some examples, instructions 122, 124, 126, 128, and any other instructions described herein in relation to storage medium 120 may be stored on a machine-readable storage medium remote from but accessible to computing device 100 and processing resource 110.

In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a Compact Disc Read Only Memory (CD-ROM), any other type of compact disc, a DVD, etc.), and the like, or a combination thereof. Further, any machine-readable storage medium described herein may be non-transitory.

In examples described herein, instructions 122, 124, 126, and 128 may implement a portion of a quality gateway system to act as an intermediary between software developers (or other users) and an SCM system. In such examples, rather than a developer committing code changes for the shared code to the SCM system directly, the developer may submit a job including the code changes to the quality gateway system. In such examples, the quality gateway system may perform a validation process on the code changes included in the submitted job, commit the code changes to the SCM system if the changes are successfully validated, and reject (i.e., not commit) the code changes if not successfully validated. In some examples, the SCM system may be implemented by computing device 100. In other examples, the SCM system may be implemented, at least in part, on a computing device remote from but accessible to computing device 100.

In examples described herein, a "job" may include a collection of at least one code change requested to be committed to shared code. In some examples, the job may be provided to the quality gateway system as part of a request to commit the code change(s) included in the job to the shared code, or the job itself may represent, to the quality gateway system; a request to commit the included code change(s) to the shared code. A job may include code changes in any suitable format or representation. For example, a job may include code changes in the form of a software patch, or the like.

In the example of FIG. 1A, instructions 122 may receive a plurality of jobs 165. Each of the plurality of jobs 165 may include at least one code change requested to be committed to shared code. Instructions 122 may receive various different jobs of the plurality of jobs 165 from various different users of a SCM system, such as software developers.

Instructions 124 may place each of the jobs received by instructions 122 (i.e., each of jobs 165) in a queue 140. In some examples, queue 140 may be a first-in-first-out (FIFO) data structure implemented by instructions 124. Instructions 124 may store queue 140 in a memory (e.g., a machine-readable storage medium) of computing device 100. In other examples, queue 140 may be stored on a machine-readable storage medium remote from but accessible to computing device 100 and processing resource 110. Features of the example of FIG. 1A are described below in relation to an example plurality of jobs 165 illustrated in FIG. 1B.

Figure 1B:
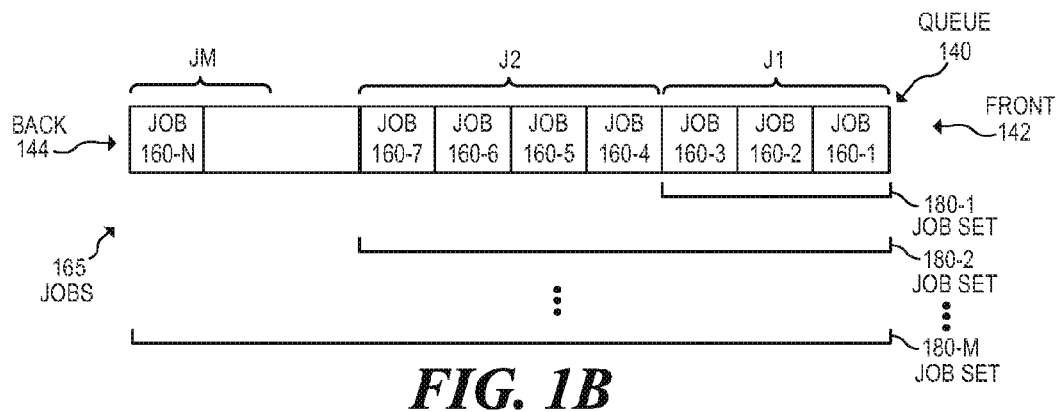
FIG. 1B is a block diagram of an example plurality of jobs stored in a queue.

FIG. 1B is a block diagram of an example plurality of jobs 165 stored in queue 140. The plurality of jobs 165 may include a number "N" jobs, where N is an integer greater than one. In the example of FIG. 1B, plurality of jobs 165 includes N jobs 160-1 through 160-N, received by instructions 122 in that order. In some examples, instructions 124 may place each of jobs 160-1 through 160-N in queue 140 in the order in which they were received, for example. In such examples, after placing each of jobs 160-1 through 160-N in queue 140, queue 140 may include the plurality of jobs 165 as illustrated in FIG. 1B. For example, job 160-1 may be at the front 142 of queue 140 and may be followed by jobs 160-2 through 160-N, in that order, with job 160-N at the back 144 of queue 140.

In the example of FIGS. 1A and 1B, the quality gateway system may include a plurality of validators. In examples described herein, a validator may be a component of a quality gateway system to perform a validation process on a plurality of jobs of a job set as a group. As used herein, a "job set" may be a set of one or more jobs. In examples described herein, performing a validation process on a plurality of jobs of a job set "as a group" may include attempting to updated a copy of shared code with all of the code changes of the plurality of jobs of the job set and, if the all the copy was successfully updated with all the code change, performing at least one test on the updated copy of the shared code. In some examples, the validator may perform the test(s) after compiling and running a build (or generating a build) of the updated shared code, or a combination thereof.

A validator may also indicate whether the plurality of jobs of the job set were successfully validated as a group by the validator. For example, the validator may indicate that the jobs were successfully validated as a group if the copy of the shared code was successfully updated with all of the code changes (i.e., the code changes did not conflict with one another), and the updated copy of the shared code passed all of the applied test(s) (e.g., after compilation or other activities to generate a build of the shared code). A validator may indicate that the jobs of the job set were not successfully validated as a group if the shared code was not successfully updated with all of the code changes (e.g., because the code changes include conflicting code changes), or the successfully updated copy of the shared code failed at least one of the applied test(s). A validator may also perform the validation process described above on a job set including one job.

In examples described herein, a job that passes or will pass the validation process may be referred to herein as a "valid job", and a job set including all valid job(s) may be referred to herein as a "valid job set". Also, in examples described herein, a job that fails or will fail the validation process may be referred to herein as an "invalid job", and a job set including at least one invalid job may be referred to herein as an "invalid job set".

In some examples, the functionalities of a validator may be implemented in the form of electronic circuitry, in the form of executable instructions encoded on a machine-readable storage medium, or a combination thereof. For example, a validator may be implemented as a computer application, such as a computer program or other set of machine-readable instructions executable by a processing resource of a computing device. In such examples, a validator (e.g., the validator application) may be executed on computing device 100, on a computing device separate from by accessible to computing device 100. In some examples, a validator executed by a computing device may be executed by a virtual machine (VM) executing on the computing device.

As noted above, in some examples, the quality gateway system comprises a plurality of validators. In some examples, the validators may be executed by one computing device (e.g., computing device 100, or another computing device in communication with computing device 100). In other examples, the validators may be executed by a plurality of computing devices, each implementing at least one of the validators. In such examples, the validators may be implemented by any combination of computing device 100 and a plurality of computing devices separate from but accessible to computing device 100.

In the example of FIGS. 1A and 1B, instructions 126 may provide a different size job set to each of the plurality of validators. Over time, jobs may be added to queue 140 (e.g., enqueued) and removed from queue 140 (e.g., dequeued). In the example of FIGS. 1A and 1B, the job sets are defined based on the jobs 165 in queue 140 (e.g., the state of the queue) at a given point in time (i.e., the given time). For example, instructions 126 may determine job sets based on the particular sequence of jobs included in queue 140 at the given time. For example, each of the job sets may include a consecutive group of one or more of the plurality of jobs 165 in queue 140 at the given time, with each group beginning with the job at the front 142 of queue 140 at the given time.

In some examples, instructions 126 may periodically determine to provide different size job sets (of jobs in queue 140) to each of the plurality of validators to undergo the validation process. In response to this determination, instructions 126 may determine the jobs to be included in each job set based on the jobs in queue 140 at a given time (e.g., approximately the time that the determination was made or soon thereafter). In the example of FIGS. 1A and 1B, queue 140 may include jobs 160-1 through 160-N at the given time.

Instructions 126 may determine a number "M" job sets, where M is an integer greater than zero. In such examples, instructions 126 may determine a plurality of different size job sets 180-1 through 180-M, as illustrated in FIG. 1B. As noted above, each of the job sets may include a consecutive group of one or more of the plurality of jobs 165 in queue 140 at the given time, with each group beginning with the job at the front 142 of queue 140 at the given time. In such examples, a first job set 180-1 may include a consecutive set of jobs 160-1, 160-2, and 160-3, which begins with job 160-1 at the front 142 of queue 140 at the given time. In some examples, a second job set 180-2 may include a consecutive set of jobs 160-1 through 160-7, which begins with job 160-1 at the front 142 of queue 140 at the given time. In the example of FIG. 1B, job set 180-M may include a consecutive set of jobs 160-1 through 160-N, which begins with job 160-1 at the front 142 of queue 140 at the given time.

In some examples, the plurality of job sets determined by instructions 126 may also include one or more additional job sets having sizes between the respective sizes of job sets 180-2 and 180-M, depending on the number of validators (M). In other examples, the plurality of jobs sets may include one or two job sets, depending on the number of validators (M).

In the example of FIGS. 1A and B, instructions 126 may provide each of the different size job sets 180-1 through 180-M, determined by instructions 126, to respective validators of the plurality of validators, as illustrated in FIG. 1A. In such examples, each job set provided a respective validator includes all of the code changes of all of the jobs included in the provided job set. Each validator may perform the validation process described above on the job set provided to it, including indicating whether the jobs of the provided job set were successfully validated as a group by the validator. The validators may perform the validation process on the job set provided to it in parallel with one another.

In the example of FIG. 1A, instructions 128 may receive, from each of the validators, an indication 190 of whether all of the jobs of the provided job set (i.e., the job set provided to it) were successfully validated as a group by the validator. For example, instructions 128 may receive, from a validator provided job set 180-1, an indication 190 of whether all of the jobs of job set 180-1 were successfully validated by the validator. As another example, instructions 128 may receive, from a validator provided job set 180-M, an indication 190 of whether all of the jobs of job set 180-M were successfully validated by the validator.

Based on the received indications 190, instructions 128 may identify the largest job set successfully validated by the validators. As used herein, a job set is successfully validated if all of the jobs of the job set are successfully validated as a group (e.g., by a validator). Instructions 128 may further commit, to the shared code, each code change of each of the jobs of the identified job set, and remove from queue 140 each of the jobs of the identified job set. In such examples, instructions 128 commit the code changes to the shared code by submitting to the SCM system a request to commit the code changes, or may otherwise commit the code changes to the shared code of the SCM system itself.

Referring to FIGS. 1A and 1B, if indications 190 indicate that job sets 180-1 and 180-2 were successfully validated, but none of the other job sets were successfully validated, then instructions 128 may identify job set 180-2 as the largest job set successfully validated, commit the code changes of job set 180-2 to the shared code, and remove (i.e., dequeue) jobs 160-1 through 160-7 of job set 180-2 from queue 140.

As illustrated in FIG. 1B, since each of jobs sets 180-1 through 180-M include a consecutive group of job sets beginning with the job set at the front 142 of the queue, each of job sets 180-1 through 180-M overlap one another. By providing overlapping job sets of different sizes to respective validators to be validated in parallel, examples described herein may more readily identify an invalid job in the queue while efficiently validating multiple jobs as a group in a manner that allows valid jobs to be committed to the shared code consistent with the order in which they appear in the queue (i.e., such that a later valid job in the queue is not committed before an earlier valid job in the queue).

For example, if indications 190 indicate that job set 180-1 was successfully validated, but none of the other job sets were successfully validated, then instructions 128 may identify job set 180-1 as the largest job set successfully validated, commit the code changes of job set 180-1 to the shared code, and remove jobs 160-1 through 160-3 of job set 180-1 from queue 140. In such examples, because job sets 180-1 and 180-2 overlap, a first invalid job in the queue may be identified as belonging to the portion of job set 180-2 that does not overlap with job set 180-1, which in this example is jobs 160-4 through 160-7. The invalid job(s) among this group may be identified as described below in relation to FIG. 4. Although a relatively small example of three jobs being validated as a group is described above to demonstrate concepts related to examples described herein, examples described herein may validate as a group the jobs of much larger job sets.

For example, instructions 126 may prudently select the respective sizes of the job sets provided to the validators in manner that may increase the chances of validating, as a group, a large number of consecutive jobs beginning with a job at the front of the queue. In some examples the respective sizes of the job sets may be represented by a set size distribution S. In examples described herein, a set size distribution may be a set of different values each representing a set size for a respective job set of a plurality of job sets. As used herein, the "size" or "set size" of a job set is the number of jobs included in the job set, and may be an integer greater than zero. In examples described herein, a set size distribution may represent the respective sizes of job sets of an actual plurality of job sets (i.e., provided to validators), or may be a "potential" set size distribution representing possible set sizes that could be used to define a plurality of job sets based on a plurality of jobs in a queue. A set size distribution S for M job sets may be represented as S={$s_1$, $s_2$, ..., $s_M$}, where each value $s_i$ is an integer greater than zero representing the set size of a respective job set 180-i among job sets 180-1 through 180-M, for example. In examples described herein, for each set size $s_i$ of a set size distribution S, $s_{i-1} \leq s_i$ (if S includes an $s_{i-1}$) and $s_i \leq s_{i+1}$ (if S includes an $s_{i+1}$).

In the example of FIGS. 1A and 1B, instructions 126 may determine a set size distribution based on the number of validators (M), the number of jobs (N) in queue 140, and a job failure probability, which may be represented herein by "$\alpha$". In such examples, instructions 126 may determine the respective sizes of job sets 180-1 through 180-M based on job failure probability $\alpha$ by determining the set size distribution for job sets 180-1 through 180-M based on job failure probability $\alpha$, M, and N, as described below. In such examples, instructions 126 may determine a set size distribution S indicating respective sizes for M job sets of different sizes, and then determine job sets 180-1 through 180-M having the respective set sizes indicated by the determined set size distribution.

In examples described herein, job failure probability $\alpha$ may be a value representing, for any given one of the plurality of jobs, the probability of the job failing validation. In some examples, job failure probability $\alpha$ may be a value between 0 and 1 representing the probability of a job failing validation. For example, job failure probability $\alpha$ may be 0.01, indicating that the probability of a job failing validation is 1/100. In some examples, the value of job failure probability $\alpha$ may be configurable by a user of the quality gateway system. In the example of FIGS. 1A and 1B instructions 126 may dynamically update the value of job failure probability $\alpha$ based on a job failure interval. In such examples, the initial value of job failure probability $\alpha$ may be configurable by a user.

In some examples, instructions 126 may determine an updated job failure probability $\alpha_{i+1}$ utilizing the following formula (Formula 1):

$$\alpha_{i+1} = \beta * \alpha_i + (1 - \beta) * \frac{1}{f}$$

In Formula 1, "$\alpha_i$" represents a current job failure probability, "f" represents a job failure interval, and "$\beta$" represents a configurable weight value between 0 and 1. In some examples, the job failure interval "f" may be an integer representing the number of jobs between the most recent invalid job identified and the immediately preceding invalid job identified (i.e., the last invalid job identified before the most recent invalid job). The calculation of the value of job failure interval f may count one, both, or neither of the invalid jobs hounding the job failure interval, for example. Although Formula 1 represents one example of how instructions 126 may update job failure probability $\alpha$, in other examples, instructions 126 may update job failure probability $\alpha$ in any other suitable manner. For example, instructions 126 may utilize Formula 1 to update job failure probability $\alpha$ based on an exponential moving average. In other examples, instructions 126 may use any other type of moving average, or the like.

Instructions 126 may determine a set size distribution to be utilized as the respective set sizes for a plurality of job sets. In some examples, instructions 126 may determine the set size distribution to be the potential set size distribution having, among a plurality of potential set size distributions, a maximum number of jobs probabilistically expected to be validated as a group, given the potential set size distribution as the respective sizes of the job sets. As described below, instructions 126 may calculate a number of jobs probabilistically expected to be validated as a group for given set size distribution based on job failure probability $\alpha$. In examples described herein, a set size distribution may be represented as a set S={$s_1$, $s_2$, $s_3$, ..., $s_M$} of M set sizes, as described above, or as set of M set size parameters {$j_1$, $j_2$, ..., $j_M$}, each of which may be an integer greater than zero. In such examples, the respective set sizes of a set size distribution S may derived from the set size parameters as follows:

$$\{j_1, j_1+j_2, j_1+j_2+j_3, \ldots, \Sigma_{i=1}^{M} j_i\} = \{=s_1, s_2, s_3, \ldots, s_M\} = S$$

In such examples, an assignment of values to each of the set size parameters {$j_1$, $j_2$, ..., $j_M$} may represent a set size distribution S. In the example of FIG. 1B, the set size $s_1$ of job set 180-1 is $j_1$=3 ($j_1$ is illustrated as "J1"). Also in the example of FIG. 1B, the set size $s_2$ of job set 180-2 is $j_1+j_2$=7 ($j_2$ is illustrated as "J2"). FIG. 1B also illustrates set size parameter $j_M$ as "JM". Because a set size distribution S may be represented in terms of the set size parameters, as shown and described above, an assignment of values to the set of set size parameters {$j_1$, $j_2$, ..., $j_M$} may be referred to herein as a set size distribution or as representing a set size distribution.

In some examples, instructions 126 may determine a set size distribution based on the expected value of a random variable X (as the terms "expected value" and "random variable" are used in the field of probability), where X denotes a number of jobs that pass the validation process described above, in which M different size job sets are provided to M validators for validation. The expected value of X may be calculated based on job failure probability α, set size parameters $j_1$-$j_M$, and the probabilities of various events in a probability space (Ω, P), as defined below.

In examples described herein, Ω is a set of size (M+1), wherein Ω={$ω_0, ω_1, \ldots, ω_M$}. In such examples, each $ω_k$ represents an event in which the respective validators provided job sets of sizes $s_1$-$s_k$ (e.g., provided job sets 180-1-180-$k$), respectively, each successfully validated all jobs of the provided job set, and the respective validators provided job sets of sizes $s_{k+1}$-$s_M$ (e.g., provided job sets 180-($k$+1)-180-M), respectively, each failed to validated all jobs of the provided job set. In other words, each $ω_k$ represents an event in which the respective job sets of sizes $s_1$-$s_k$ (e.g., job sets 180-1-180-$k$) are each valid job sets, and the respective job sets of sizes $s_{k+1}$-$s_M$ (e.g., job sets 180-($k$+1)-180-M) are each invalid job sets. As such, $ω_u$ may also represent an event in which validation succeeds for a job set of size $s_k$ of a set size distribution S and fails for any job set having a set size of distribution S that is larger than size $s_k$ (i.e., sizes $s_{k+1}$-$s_M$), wherein set size distribution S represents the respective set sizes of the job sets provided to M validators. The probability of an event $ω_k$, for each value of k for which 0<k<M, may be expressed as the following formula (Formula 2):

$P(ω_k) = (1-α)^{\sum_{i=1}^{k} j_i}(1-(1-α)^{j_{k+1}})$, for 0<k<M

Each parameter of Formula 2 is described above.

The probability of event $ω_k$ when k=0 represents the probability that all M job sets fail the validation process at the respective validators to which they are provided. In other words, the event $ω_k$ when k=0 represents an event in which all of the provided job sets (e.g., all of the respective job sets of sizes $s_1$-$s_M$, all of job sets 180-1-180-M) are invalid job sets. The probability of an event $ω_k$ when k=0 may be expressed as the following formula (Formula 3):

$P(ω_k) = 1-(1-α)^{j_1}$, for k=0

Each parameter of Formula 3 is described above.

The probability of event $ω_k$ when k=M represents the probability that all M job sets are successfully validated at the respective validators to which they are provided. In other words, the event $ω_k$ when k=M represents an event in which all of the provided job sets (e.g., all of the respective job sets of sizes $s_1$-$s_M$, all of job sets 180-1-180-M) are valid job sets. As such, the probability of $ω_k$ when k=M may also represent the probability that the validation succeeds for the largest job set of a set size distribution S (i.e., for the job set of size $s_M$), wherein set size distribution S represents the respective set sizes of the job sets provided to M validators. The probability of an event $ω_k$ when k=M may be expressed as the following formula (Formula 4):

$P(ω_k) = (1-α)^{\sum_{i=1}^{M} j_i}$, for k=M

Each parameter of Formula 4 is described above.

In such examples, the expected value of X may be expressed as the following (Formula 5):

$$E[X] = \sum_{k=1}^{M-1}\left[(1-α)^{\sum_{i=1}^{k} j_i}(1-(1-α)^{j_{k+1}})\sum_{i=1}^{k} j_i\right] + (1-α)^{\sum_{i=1}^{M} j_i}\sum_{i=1}^{M} j_i$$

Formula 5 is a function with M variables, namely the M set size parameters {$j_1, j_2, \ldots, j_M$}. In such examples, for each assignment of values to the set size parameters {$j_1, j_2, \ldots, j_M$}, E[X] represents the expected number of jobs to be validated when M job sets are provided to M different validators for validation of each job set as a group, given the size set distribution represented by the set size parameters as the respective sizes of the jobs sets. An "expected" number of jobs determined based on a calculation of an expected value (as that term is used in the field of probability) may be referred to herein as a "probabilistically expected" number of jobs. For example, a number of jobs calculated based on Formula 5 above may be referred to herein as a "probabilistically expected" number of jobs.

The number of jobs validated via the validation process described above may be the number of jobs in the largest job set validated as a group at one of the validators, since the job sets overlap such that any job validated in the process is validated as part of the largest successfully validated job set (regardless of whether it is validated as part of another valid job set). As such, E[X] may represent the expected number of jobs to be validated as part of the largest job set successfully validated at one of the validators during the validation process.

In some examples, instructions 126 may determine the size set distribution for job sets 180-1-180-M by determining the assignment of values to the set size parameters {$j_1, j_2, \ldots, j_M$} that maximizes E[X] (the probabilistically expected number of jobs to be validated as a group as part of the largest successfully validated job set), among a finite number of possible assignments of values to the set size parameters. As noted above, an assignment of values to each of the set size parameters {$j_1, j_2, \ldots, j_M$} may represent a set size distribution S. As such, each assignment of values to the set size parameters may represent a potential set size distribution. Accordingly, in this manner, instructions 126 may determine the set size distribution for job sets 180-1-180-M by determining the potential set size distribution that maximizes E[X] among a finite plurality of potential set size distributions. In some examples, a maximum value of E[X] may be a single maximum value of E[X] among the values of E[X] calculated for the potential set size distributions, or may be any one of a plurality of values of E[X] that are tied for the maximum value.

As noted above, each assignment of values to the set size parameters may represent a potential set size distribution. In such examples, instructions 126 may determine E[X] for each of a plurality of different assignments of values to the set size parameters {$j_1, j_2, \ldots, j_M$} (i.e., for a plurality of different potential set size distributions) and determine the assignment of values that maximizes E[X] among the different assignments (i.e., among the different potential set size distributions).

In some examples, the potential assignments of values to set size parameters {$j_1, j_2, \ldots, j_M$} may be limited in any of various ways such that an assignment that maximizes E[X] among a finite number of possible assignments may be found. For example, instructions 126 may determine E[X] for each assignment of values to set size parameters {$j_1, j_2, \ldots, j_M$} for which $\sum_{i=1}^{M} j_i \leq N$ (i.e., the largest set size in less than or equal to the number of jobs in queue 140). Additionally or alternatively, the range of values that may be assigned to each set size parameter $j_i$ may be limited based on job failure probability α. For example, if α is about 0.01, indicating that about 1/100 jobs fail validation, then each set size parameter $j_i$ may be limited to a range of possible values of about 1-100, for example. Additionally or alternatively, in some examples, the assignment of values to set size parameters may be limited to assignments in which each of the set size parameters are equal to one another (i.e., $j_1 = j_2 = \ldots = j_M$). In such examples, each of the set size parameters may represent the same baseline number of jobs for a given assignment of values, and each of a plurality of set sizes of a potential set size distribution represented by the assignment of values may be a different multiple of the baseline number of jobs. For example, for each of a plurality of potential set size distributions represented by an assignment of set size parameter values in which each of the set size parameters are equal to one another, the respective set sizes of the potential set size distribution represented by the assignment of set size parameters may be $\{j_1, 2*j_1, 3*j_1, \ldots, M*j_1\} = \{s_1, s_2, s_3, \ldots, s_M\}$, wherein $j_1$ represents the baseline number of jobs.

In the example of FIGS. 1A and 1B, after determining the set size distribution as described above, instructions 126 may provide, to the validators, job sets 180-1-180-M having the respective set sizes specified by the determined set size distribution. In this manner, instructions 126 may prudently select the respective sizes of job sets 180-1-180-M provided to the validators in manner that may increase the chances of validating a large number of jobs at the front of the queue as a group in the validation process.

In the example of FIGS. 1A and 1B, instructions 126 may determine a set size distribution based on Formula 5, as described above, and may further utilize the respective set sizes of the determined size set distribution as the respective set sizes of job sets 180-1-180-M. In such examples, instructions 126 may determine the respective sizes of job sets 180-1-180-M based on job failure probability $\alpha$, which is utilized by Formula 5.

In such examples, by determining the set size distribution utilized as the respective set sizes of job sets 180-1-180-M based on Formula 5, as described above, instructions 126 may also determine the set size distribution based on the probabilities of various events $\omega_k$. For example, as described above, instructions 126 may calculate E[X] for the set size distribution (i.e., for the assignment of values to the set size parameters that represents the set size distribution) before determining that the set size distribution is to be utilized for the respective sizes of job sets 180-1-180-M. In such examples, the calculation of E[X] for a particular set size distribution is based on, for each given set size of the distribution, the probability of validation succeeding for a job set of the given set size and failing for any job set of a set size of the particular distribution that is larger than the given size. As described above, the probability of such an event ($P(\omega_k)$) is represented by Formula 2 when the given set size is not the largest set size of the distribution (i.e., $0 < k < M$), and is represented by Formula 4 when the given set size is the largest set size of the distribution (i.e., $k = M$). Referring to Formula 5, the calculation of E[X] for a particular set size distribution is based in part on $P(\omega_k)$ calculated in accordance with Formula 2 for each k where $0 < k < M$, as indicated by the following portion of Formula 5:

$$\sum_{k=1}^{M-1} \left[ (1-\alpha)^{\sum_{i=1}^{k} j_i} (1 - (1-\alpha)^{j_{k+1}}) \sum_{i=1}^{k} j_i \right]$$

and is also based in part on $P(\omega_k)$ calculated in accordance with Formula 4 for $k=M$, as indicated by the following portion of Formula 5:

$$(1-\alpha)^{\sum_{i=1}^{M} j_i} \sum_{i=1}^{M} j_i$$

Additionally, in some examples, as described above, instructions 126 may calculate E[X] for a plurality of potential set size distributions and determine the potential set size distribution that maximizes E[X], among the potential set size distributions, to be the set size distribution whose respective set sizes are utilized as the respective set sizes of job sets 180-1-180-M.

Additionally, in some examples, instructions 126 may determine, for each of a plurality of potential set size distributions, a number of jobs probabilistically expected to be successfully validated as a group by the validators, given the potential set size distribution as the respective sizes of the job sets provided to the validators. For example, as described above, instructions 126 may calculate E[X] (based on Formula 5) for a plurality of potential set size distributions. In such examples, the probabilistically expected number of jobs for each of the potential set size distributions may be determined based on job failure probability $\alpha$ and the number M of the plurality of validators, each of which is utilized in Formula 5. In such examples, instructions 126 may also select the potential set size distribution for which a largest number of jobs was determined as the set size distribution whose respective set sizes are utilized as the respective set sizes of job sets 180-1-180-M. In this manner, instructions 126 may determine the potential set size distribution that maximizes E[X], among the potential set size distributions, to be the set size distribution whose respective set sizes are utilized as the respective set sizes of job sets 180-1-180-M. In some examples, the largest number of jobs may be the absolute largest value of E[X] among the values of E[X] calculated for the potential set size distributions, or may be any one of a plurality of values of E[X] that are tied for the largest value.

In some examples, instructions 122, 124, 126, and 128 may be part of an installation package that, when installed, may be executed by processing resource 110 to implement the functionalities described herein in relation to instructions 122, 124, 126, and 128. In such examples, storage medium 120 may be a portable medium, such as a CD. DVD, or flash drive, or a memory maintained by a server from which the installation package can be downloaded and installed. In other examples, instructions 122, 124, 126, and 128 may be part of an application, applications, or component already installed on computing device 100 including processing resource 110. In such examples, the storage medium 120 may include memory such as a hard drive, solid state drive, or the like. In some examples, functionalities described herein in relation to FIGS. 1A and 1B may be provided in combination with functionalities described herein in relation to any of FIGS. 2-4.

Figure 2:
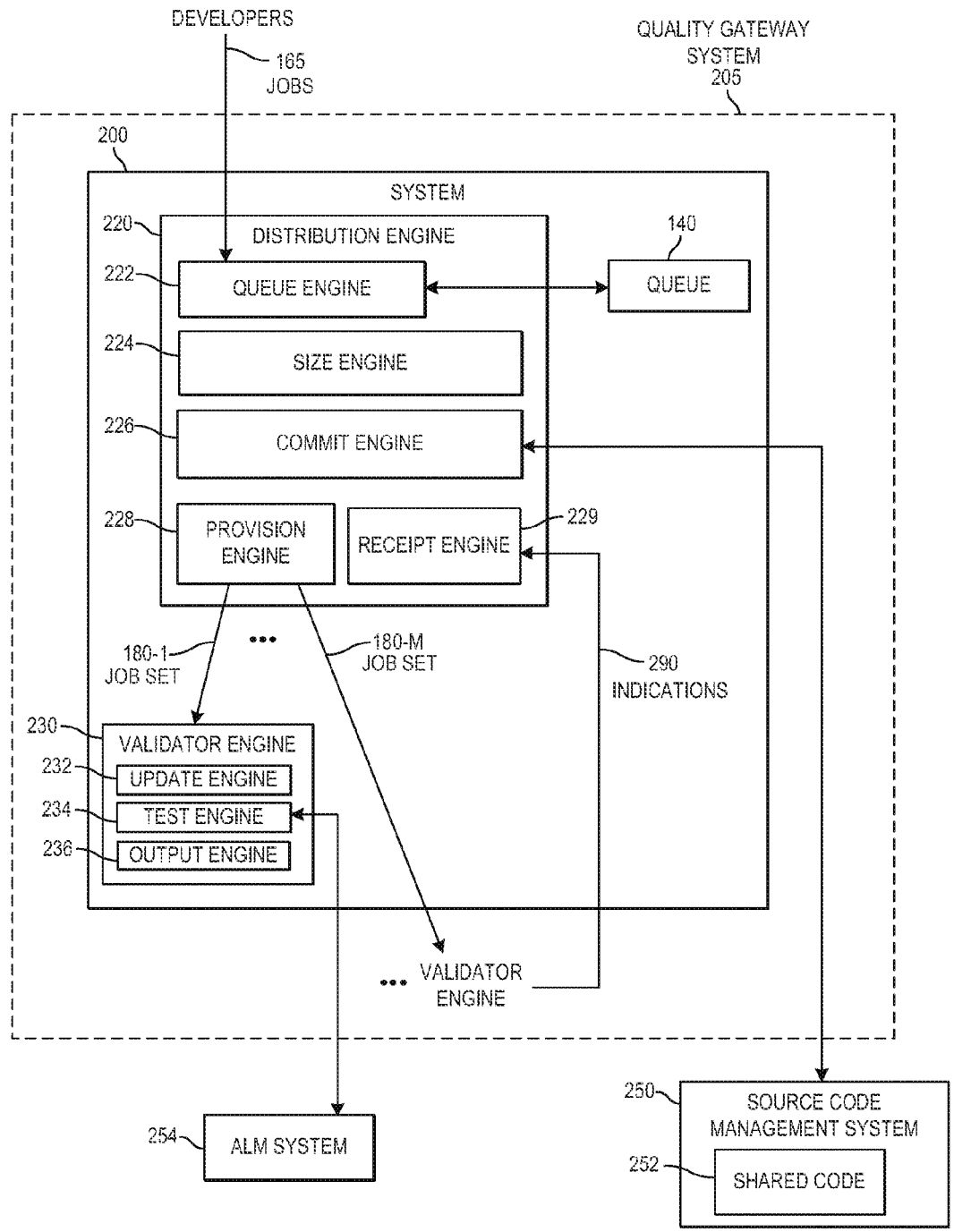
FIG. 2 is a block diagram of an example system to determine a set size distribution based on a job failure probability.

FIG. 2 is a block diagram of an example system 200 to determine a set size distribution based on a job failure probability. In the example of FIG. 2, system 200 may be included as part of a quality gateway system 205, as described above in relation to FIG. 1A. Quality gateway system 205 may also include a plurality of validator engines, each of which may implement the functionalities of a validator, as described above in relation to FIGS. 1A and 1B. In the example of FIG. 2, system 200 may include at least one of the validator engines (e.g., a validator engine 230).

In the example of FIG. 2, system 200 is in communication with a source code management (SCM) system 250 comprising shared code 252, as described above. In addition, validator engine 230 of system 200 is also in communication with an application lifecycle management (ALM) system 254. In some examples, ALM system 254 may be a system for managing information associated with various aspects of the life of application(s). For example, ALM system 254 may manage information about releases, defects, requirements, tests, and the like, associated with the application(s).

In the example of FIG. 2, system 200 includes engines 220, 222, 224, 226, 228, 229, 230, 232, 234, and 236. In some examples, system 200 may include additional engines. Each of the engines of system 200, may be any combination of hardware and programming to implement the functionalities of the respective engine. Such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement system 200. The machine-readable storage medium storing the instructions may be integrated in a computing device including the processing resource to execute the instructions, or the machine-readable storage medium may be separate but accessible to the computing device and the processing resource. The processing resource may comprise one processor or multiple processors included in a single computing device or distributed across multiple computing devices. In other examples, the functionalities of any of the engines may be implemented in the form of electronic circuitry. Additionally, in the example of FIG. 2, each of the validator engines that is not part of system 200 may be any combination of hardware and programming to implement the functionalities of the respective engine, as described above in relation to the engines of system 200.

In some examples, the instructions can be part of an installation package that, when installed, can be executed by the processing resource to implement system 200. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on a computing device including the processing resource. In such examples, the machine-readable storage medium may include memory such as a hard drive, solid state drive, or the like.

In the example of FIG. 2, system 200 includes a distribution engine 220 including engines 222, 224, 226, 228, and 229, and a validator engine 230 including engines 232, 234, and 236. Queue engine 222 may receive a plurality of jobs 165 from users, such as software developer(s), as described above in relation to FIG. 1A. In some examples, engine 222 may place each of the plurality of received jobs 165 in a queue 140, as described above in relation to FIGS. 1A and 1B. Features of the example of FIG. 2 may be described below in relation to the example plurality of jobs 165 illustrated in FIG. 1B. In the example of FIG. 2, each of the plurality of jobs 165 may include at least one code change requested to be committed to shared code.

Size engine 224 may determine a set size distribution. In some examples, engine 224 may determine the set size distribution based on a job failure probability $\alpha$, as described above in relation to FIGS. 1A and 1B. Job failure probability $\alpha$ may represent, for any given one of jobs 165, a probability of the job failing validation, as described above, and may be set, updated, and the like, as described above.

In some examples, engine 224 may determine, for each of a plurality of potential set size distributions, a number of jobs probabilistically expected to be successfully validated as a group by the validation engines given the potential set size distribution as the respective sizes of the job sets. Engine 224 may determine the probabilistically expected number of jobs for each of the potential set size distributions, as described above in relation to FIGS. 1A and 1B. For example, may determine the probabilistically expected number of jobs E[X], based on Formula 5, for each of the potential set size distributions, each of which may be represented by a respective assignment of values to a set of set size parameters $\{j_1, j_2, \ldots, j_M\}$.

In some examples, engine 224 may further determine the potential set size distribution having the maximum probabilistically expected number of jobs E[X], among the plurality of potential set size distributions, as described above. In such examples, engine 224 may further determine the set size distribution to be utilized as the respective set sizes for job sets 180-1-180-M to be the potential set size distribution having the maximum probabilistically expected number of jobs E[X] among the potential set size distributions.

Provision engine 228 may provide a plurality of job sets 180-1-180-M to a plurality of validator engines, respectively. The plurality of validator engines may include a number "M" validator engines. In some examples, the plurality of validator engines may include validator engine 230 of system 200. In the example of FIG. 2, each of the provided job sets 180-1-180-M has a different respective size, as specified by the determined set size distribution. Also, each of job sets 180-1-180-M comprises a consecutive group of one or more of the jobs 165 in queue 140 at a given time and beginning with the job at the front of the queue at the given time, as described above in relation to FIGS. 1A and 1B.

In the example of FIG. 2, each of the plurality of validator engines may perform the validation process, described above in relation to the validators, on the job set provided to it, including indicating whether the jobs of the provided job set were successfully validated as a group by the validator engine. In such examples, receipt engine 229 may receive, from each of the validator engines, an indication 290 of whether all of the jobs of the provided job set were successfully validated as a group by the validator engine.

Commit engine 226 may determine, based on the received indications 290, which of job sets 180-1-180-M is the largest job set for which all of the jobs of the jobs set were successfully validated as a group at one of the validator engines. In such examples, engine 226 may commit, to shared code 252, each code change of each of the jobs of the largest job set successfully validated at one of the validator engines. In such examples, queue engine 222 may further remove from queue 140 each of the jobs of the largest job set successfully validated at one of the validator engines (e.g., after the code changes of the those jobs have been committed to the shared code).

As described above, system 200 may include at least one validator engine 230 of the plurality of validator engines of quality gateway engine 205. In the example of FIG. 2, provision engine 228 of distribution engine 220 may provide one of job sets 180-1-180-M to validator engine 230, and validator engine 230 may perform the validation process described above on the provided job set. For example, in the example of FIG. 2, validator engine 230 may receive job set 180-1 from engine 228. In such examples, update engine 232 may update a copy of shared code 252 with all of the code changes of the jobs provided to the given validation engine. For example, as illustrated in FIG. 1B, job set 180-1 may include jobs 160-1-160-3. In such examples, engine 232 may update a copy of shared code 252 with each of the code changes included in jobs 160-1-160-3.

After updating the copy of shared code 252, test engine 234 may perform a plurality of tests on updated copy of shared code 252. For example, engine 234 may compile and run (or generate) a build of the updated copy of shared code 252 (or a combination thereof), and then perform on the compiled code, build, etc., any combination of unit test(s), component test(s), system test(s), end-to-end test(s), or any other suitable type of test. Engine 234 may further determine whether each of the applied tests was passed by the updated copy of the shared code 252, in response to a determination that the updated copy of shared code 252 passed all of the applied tests, output engine 236 may output, as the indication 290 from validation engine 230, a success indication specifying that all of the jobs (e.g., 160-1-160-3) of the job set provided to validation engine 230 (e.g., job set 180-1) were successfully validated as a group by validation engine 230, in response to a determination that the updated copy of shared code 252 did not pass all of the applied tests, output engine 236 may output, as the indication 290 from validation engine 230, a failure indication specifying that the job set failed validation.

In some examples, test engine 234 may further determine whether any of the code changes of the provided job set are identified as being a fix for a defect. For example, certain code changes of a job included in the jobs set may have been identified by the submitting developer as being a fix for a known defect being tracked in ALM system 254. In such examples, in response to a determination that at least one of the code changes is identified as being a fix for a defect, test engine 234 may access ALM system 254 to identify at least one test associated with the defect in ALM system 254. For example, ALM system 254 may link test(s) to the identified defect, such as test(s) to determine whether the identified defect has been corrected. In such examples, in response to the determination that some of the code changes are identified as a fix for a defect, the test engine may further perform the test(s) identified as associated with the defect as part of the plurality of tests performed on the updated copy of shared code 252. In such examples, the job set may not pass validation if the test(s) linked to the defect are not also passed. In some examples, functionalities described herein in relation to FIG. 2 may be provided in combination with functionalities described herein in relation to any of FIGS. 1A-1B and 3-4.

FIG. 3 is a flowchart of an example method 300 for determining a set size distribution based on a number of jobs probabilistically expected to be successfully validated as a group. Although execution of method 300 is described below with reference to computing device 100 of FIG. 1, other suitable systems for execution of method 300 can be utilized (e.g., system 200). Additionally, implementation of method 300 is not limited to such examples.

At 305 of method 300, instructions 124 may place a plurality of jobs 165 in a queue 140, wherein each job includes at least one code change requested to be committed to shared code, as described above in relation to FIGS. 1A and 1B. In some examples, the job 165 may be received by instructions 122 from a plurality of different users, for example. At 310, instructions 126 may determine, with a processing resource to execute instructions 126, a set size distribution based on a number of the jobs probabilistically expected to be successfully validated as a group by a plurality of validators provided respective job sets having respective sizes specified by the set size distribution.

In some examples, instructions 126 may also determine the set size distribution based on a job failure probability α. For example, as described above, instructions 126 may determine, for each of a plurality of potential set size distributions, a number of jobs E[X] probabilistically expected to be successfully validated as a group by the validators, given the potential set size distribution as the respective sizes of the job sets provided to the validators, in some examples, E[X] may be determined based on job failure probability α utilizing Formula 5. In some examples, instructions 126 may select, as the set size distribution, the potential set size distribution for which a maximum number of jobs E[X] was determined, as described above in relation to FIG. 1A.

At 315, instructions 126 may provide job sets 180-1-180-M, having respective sizes specified by the determined set size distribution, to the validators, respectively. In such examples, each job set may comprise a consecutive group of the jobs in queue 140 at a given time and beginning with the job at the front 142 of queue 140 at the given time, as described above. At 320, instructions 128 may receive, from each of the validators, an indication 190 of whether all of the jobs of the provided job set were successfully validated as a group by the validator.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1A-2 and 4.

FIG. 4 is a flowchart of an example method 400 for updating a job failure probability based on a job failure interval. FIG. 4 is a flowchart of an example method 400 for outputting a coverage report including event and input coverage metrics, and interface coverage values. Although execution of method 400 is described below with reference to computing device 100 of FIG. 1, other suitable systems for execution of method 400 can be utilized (e.g., system 200). Additionally, implementation of method 400 is not limited to such examples.

At 405 of method 200, instructions 124 may place a plurality of jobs 165 in a queue 140, wherein each job includes at least one code change requested to be committed to shared code, as described above in relation to FIGS. 1A and 1B. In some examples, the job 165 may be received by instructions 122 from a plurality of different users, for example. At 410, instructions 126 may determine, with a processing resource to execute instructions 126, a set size distribution based on a number of the jobs probabilistically expected to be successfully validated as a group by a plurality of validators provided respective job sets having respective sizes specified by the set size distribution, as described above in relation to FIG. 1A and Formula 5, for example. In such examples, instructions 126 may determine the set size distribution based on a job failure probability α.

At 415, instructions 126 may provide job sets 180-1-180-M, having respective sizes specified by the determined set size distribution, to the validators, respectively. In such examples, each job set may comprise a consecutive group of the jobs in queue 140 at a given time and beginning with the job at the front 142 of queue 140 at the given time, as described above. At 420, instructions 128 may receive, from each of the validators, an indication 190 of whether all of the jobs of the provided job set were successfully validated as a group by the validator.

At 425, instructions 128 may identify, based on the received indications 190, the largest job set successfully validated by the validators. At 430, instructions 128 may commit, to the shared code, each code change of each job of the identified job set. At 435, instructions 124 may remove, from queue 140, each job of the identified job set.

At 440, instructions 126 and 128 may identify an earliest invalid job in queue 140. For example, if the largest job set that was successfully validated was not the largest of the job sets provided to the validators, then the smallest invalid job set includes the earliest invalid job in the queue. In such examples, instructions 126 may begin a clean-up process at 440. In other examples, if the largest successfully validated job set is also the largest job set provided to a validator, then none of the jobs sets included an invalid job, and method 400 may bypass the clean-up process and proceed to a next iteration of providing job sets to validators to perform the validation process, as described above.

In the clean-up process, at 440, instructions 126 and 128 may identify the earliest invalid job in the queue among the jobs included in the smallest failing (i.e., invalid) job set but not included in the largest successfully validated (i.e., valid) job set. Because the jobs sets overlap, as described above in relation to FIGS. 1A and 1B, the earliest invalid job is included in the sequence of jobs making up the difference between the largest valid job set and the smallest invalid job set. To identify the earliest invalid job, instructions 126 may divide the jobs making up the difference between the largest valid job set and the smallest invalid job set among the validators in any of various ways. For example, instructions 126 may distribute the jobs to the M validators as M overlapping consecutive job sets of different sizes, each beginning from the first job of the queue, and with respective set sizes differing by one, such that a validator 1 gets one job, a validator 2 gets two jobs, etc., and a validator M gets M jobs. The validators may then return indications 190 indicating whether all of the jobs were successfully validated as a group. If not, then the earliest invalid job may be identified as the job that is the difference between the largest valid job set and the smallest invalid job set of the job sets. In other examples, the earliest invalid job may be determined in other ways. For example, all of the jobs making up the difference between the largest valid job set and the smallest invalid job set may be distributed equally (or approximately equally) in M non-overlapping job sets to each of the M validators. Each validator may then attempt to validate the received job set as a group. This process may then be repeated on the invalid job set closest to the front of the queue. In this manner, the earliest invalid job set may be identified by a type of M-ary search (i.e., similar to binary search, but utilizing M search paths rather than two). Instructions 128 may receive indications 190 from the validators and determine, based on these indications, the earliest invalid job in queue 140.

After identifying the earliest invalid job in queue 140, instructions 128 may continue the clean-up process at 445, at which instructions 128 may commit, to the shared code, each of the code changes of the jobs preceding the identified earliest invalid job in queue 140. At 450, instructions 124 may further remove, from queue 140, each of the jobs preceding the earliest invalid job in queue 140. At 455, instructions 123 may determine a job failure interval f based on the number of jobs between the identified invalid job and an immediately preceding invalid job identified (i.e., the last invalid job identified before the most recent invalid job). At 460, instructions 128 may update the job failure probability based on the job failure interval f, as described above in relation to Formula 1. The clean-up process may end at 460.

At 465, instructions 126 may determine whether queue 140 is empty. If so, then method 400 may end at 470. If not, then method 400 may proceed to 410, where instructions 126 may determine, based on the updated job failure probability, another set size distribution based on a number of the jobs, remaining in the queue at a subsequent time, probabilistically expected to be successfully validated as a group by the validators provided respective other job sets having respective sizes specified by the other set size distribution. The another set size distribution may be determined as described above in relation to Formula 5 utilizing the updated job failure probability. Method 400 may then proceed to 415, where instructions 126 may provide the other job sets to the validators, respectively, wherein each other job set comprises a consecutive group of the jobs remaining in the queue at the subsequent time and beginning with the job at the front of the queue at the subsequent time. In such examples, method 400 may then proceed to 420 and continue as described above.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1A-3.

What is claimed is:

1. A method executed by a system comprising a processor, comprising:
    placing a plurality of jobs in a queue, each job including at least one code change requested to be committed to shared code;
    determining, with a processing resource and based on a job failure probability, a set size distribution based on a number of the jobs probabilistically expected to be successfully validated as a group by a plurality of validators provided respective job sets having different respective sizes specified by the set size distribution;
    providing the job sets to the validators, respectively, each job set comprising a consecutive group of the jobs in the queue at a given time and beginning with the job at the front of the queue at the given time;
    receiving, from each validator, an indication of whether all of the jobs of the provided job set were successfully validated as a group by the validator;
    identifying, based on the received indications, the largest job set of the job sets respectively validated by the validators;
    committing to the shared code each code change of each job of the identified largest job set;
    removing from the queue each job of the identified largest job set; and
    identifying an earliest invalid job in the queue.

2. The method of claim 1, further comprising:
    committing to the shared code each of the code changes of the jobs preceding the earliest invalid job in the queue;

determining a current fail interval based on the number of jobs between the identified earliest invalid job and an immediately preceding invalid job; and updating the job failure probability based on the current fail interval.

3. The method of claim 2, further comprising:

determining, based on the updated job failure probability, a further set size distribution based on a number of the jobs, remaining in the queue at a subsequent time, probabilistically expected to be successfully validated as a group by the validators provided respective other job sets having respective sizes specified by the further set size distribution; and providing the other job sets to the validators, respectively, each other job set comprising a consecutive group of the jobs remaining in the queue at the subsequent time and beginning with the job at the front of the queue at the subsequent time.

4. The method of claim 1, wherein the set size distribution comprises a distribution of sizes of the respective job sets, each size in the set size distribution specifying a number of jobs in the respective job set, and wherein a first job set of the job sets includes multiple jobs, and a second job set of the job sets includes the multiple jobs and a further job that is not part of the first job set.

5. A system comprising:

a processor; and a non-transitory storage medium storing instructions executable on the processor to:

place each of a plurality of received jobs in a queue, each job of the plurality of received jobs including at least one code change requested to be committed to shared code;

determine a set size distribution based on a job failure probability representing, for any given job of the plurality of received jobs, a probability of the given job failing validation;

provide a plurality of job sets, having different respective sizes specified by the determined set size distribution, to a plurality of validators, respectively, each job set of the plurality of job sets comprising a respective group of consecutive jobs in the queue at a given time and sharing and beginning with the job at the front of the queue at the given time;

receive, from each respective validator of the plurality of validators, an indication of whether all of the jobs of the job set provided to the respective validator were successfully validated as a group by the respective validator;

identify, based on the received indications, the largest job set of the job sets successfully validated by the validators;

commit, to the shared code, each code change of each of the jobs of the identified largest job set; and remove from the queue each of the jobs of the identified largest job set.

6. The system of claim 5, wherein the instructions are executable on the processor to:

determine, for each of a plurality of potential set size distributions, a number of jobs probabilistically expected to be successfully validated as a group by the validators given the potential set size distribution as the respective sizes of the job sets; and determine the set size distribution to be the potential set size distribution having a maximum probabilistically expected number of jobs among the plurality of potential set size distributions.

7. The system of claim 5, further comprising:

at least a given one of the validators, the given validator to:

update a copy of the shared code with all of the code changes of the jobs provided to the given validator;

perform a plurality of tests on the updated copy of the shared code; and output, as the indication from the given validator, a success indication specifying that all of the jobs of the job set provided to the given validator were successfully validated as a group by the given validator, in response to a determination that the updated copy of the shared code passed all of the plurality of tests.

8. The system of claim 7, wherein the given validator is to further:

determine whether any of the code changes of the provided job set are identified as being a fix for a defect;

in response to a determination that at least one of the code changes is identified as being a fix for a defect, access an application lifecycle management (ALM) system to identify at least one test associated with the defect; and in response to the determination, perform the at least one identified test as part of the plurality of tests.

9. The system of claim 5, wherein a first job set of the plurality of job sets includes multiple jobs, and a second job set of the plurality of job sets includes the multiple jobs and a further job that is not part of the first job set.

10. A non-transitory machine-readable storage medium encoded with instructions executable by a processing resource of a computing device to:

receive a plurality of jobs, each job of the plurality of jobs including at least one code change requested to be committed to shared code;

place each of the plurality of jobs in a queue;

determine a set size distribution based on a job failure probability representing, for any given job of the plurality of jobs, a probability of the given job failing validation;

provide different size job sets to respective validators of a plurality of validators, the different size job sets having different respective sizes specified by the determined set size distribution, each job set of the different size job sets comprising a respective group of consecutive jobs in the queue at a given time and sharing the job at the front of the queue at the given time;

receive, from each respective validator of the plurality of validators, an indication of whether all of the jobs of the job set provided to the respective validator were successfully validated as a group by the respective validator;

identify, based on the received indications, the largest job set of the different size job sets successfully validated by the validators;

commit, to the shared code, each code change of each of the jobs of the identified largest job set; and remove from the queue each of the jobs of the identified largest job set.

11. The non-transitory machine-readable storage medium of claim 10, wherein the respective size of each respective job set of the different size job sets specifies a number of jobs in the respective job set.

12. The non-transitory machine-readable storage medium of claim 11,
wherein the set size distribution is determined based on, for each given set size of the set size distribution, the probability of validation succeeding for a job set of the given set size and failing for any job set of another set size of the set size distribution larger than the given set size.

13. The non-transitory machine-readable storage medium of claim 11,
wherein the set size distribution is determined based on a number of the jobs probabilistically expected to be successfully validated as a group by the validators given the set size distribution that includes the respective sizes of the different size job sets.

14. The non-transitory machine-readable storage medium of claim 13, wherein the instructions to determine the set size distribution comprise instructions to:
determine, for each of a plurality of potential set size distributions based on the job failure probability and a number of the plurality of validators, a number of jobs probabilistically expected to be successfully validated as a group by the validators given the potential set size distribution as the respective sizes of the different size job sets provided to the validators; and
select, as the set size distribution, the potential set size distribution for which a largest number of jobs was determined.

15. The non-transitory machine-readable storage medium of claim 10, wherein the different size job sets are overlapping job sets that share multiple jobs.

16. The non-transitory machine-readable storage medium of claim 15, wherein a first job set of the different size job sets includes the multiple jobs, and a second job set of the different size job sets includes the multiple jobs and a further job that is not part of the first job set.

17. The non-transitory machine-readable storage medium of claim 16, wherein a third job set of the different size job sets includes the multiple jobs, the further job, and an additional job, the additional job not part of the first and second job sets.

* * * * *